United States Patent
Yamazaki

(10) Patent No.: US 10,949,134 B2
(45) Date of Patent: Mar. 16, 2021

(54) CLIENT APPARATUS, CONTROL METHOD, AND STORAGE MEDIUM

(71) Applicant: CANON KABUSHIKI KAISHA, Tokyo (JP)

(72) Inventor: Daisuke Yamazaki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/245,720

(22) Filed: Jan. 11, 2019

(65) Prior Publication Data
US 2019/0227755 A1    Jul. 25, 2019

(30) Foreign Application Priority Data

Jan. 19, 2018  (JP) .............................. JP2018-007184
Aug. 24, 2018  (JP) .............................. JP2018-157272

(51) Int. Cl.
*G06F 3/12*     (2006.01)
*G06F 3/0486*   (2013.01)
*H04N 1/00*     (2006.01)

(52) U.S. Cl.
CPC .......... *G06F 3/1204* (2013.01); *G06F 3/0486* (2013.01); *G06F 3/127* (2013.01); *G06F 3/1225* (2013.01); *G06F 3/1226* (2013.01); *G06F 3/1254* (2013.01); *G06F 3/1285* (2013.01); *H04N 1/0035* (2013.01)

(58) Field of Classification Search
CPC ..................................................... G06F 3/126
See application file for complete search history.

(56) References Cited

U.S. PATENT DOCUMENTS

| | | | | |
|---|---|---|---|---|
| 5,450,571 A * | 9/1995 | Rosekrans | ............ | G06F 3/1285 703/24 |
| 6,054,988 A * | 4/2000 | Alimpich | .............. | G06F 3/0481 715/769 |
| 6,917,437 B1 * | 7/2005 | Myers | ................... | G06F 3/1207 358/1.13 |
| 8,643,870 B2 * | 2/2014 | Kurihara | ............... | G06F 3/1285 358/1.15 |
| 2004/0165206 A1 * | 8/2004 | Aoki | .................. | H04L 41/0853 358/1.13 |
| 2005/0141007 A1 * | 6/2005 | Shirai | ................ | H04N 1/00244 358/1.13 |
| 2005/0141023 A1 * | 6/2005 | Yagita | ................... | G06F 3/1212 358/1.15 |
| 2010/0014112 A1 * | 1/2010 | Yoshida | ............. | H04N 1/00482 358/1.15 |
| 2011/0023054 A1 * | 1/2011 | Yamazaki | ............. | G06F 3/1225 719/321 |
| 2011/0075176 A1 * | 3/2011 | Nishio | .................. | G06F 3/1285 358/1.13 |

(Continued)

FOREIGN PATENT DOCUMENTS

| | | | | |
|---|---|---|---|---|
| EP | 2629192 A2 * | 8/2013 | ......... | H04N 1/00424 |
| JP | 2013-168030 A | 8/2013 | | |

*Primary Examiner* — Ted W Barnes
(74) *Attorney, Agent, or Firm* — Canon U.S.A., Inc. IP Division

(57) ABSTRACT

A first screen associated with printer queues is displayed in response to a user operation, and an output process of a document is executed using a printer queue selected on the first screen by a user operation.

22 Claims, 15 Drawing Sheets

(56) References Cited

U.S. PATENT DOCUMENTS

| | | | | |
|---|---|---|---|---|
| 2011/0075177 A1* | 3/2011 | Takagi | ............... | G06F 3/1204 358/1.13 |
| 2011/0075205 A1* | 3/2011 | Oomura | ............... | G06F 3/126 358/1.15 |
| 2011/0075207 A1* | 3/2011 | Nakata | ............... | G06F 3/1204 358/1.15 |
| 2011/0176167 A1* | 7/2011 | Takagi | ............... | G06F 3/1285 358/1.15 |
| 2012/0236351 A1* | 9/2012 | Arima | ............... | G06K 15/1809 358/1.13 |
| 2012/0254898 A1* | 10/2012 | Nakata | ............... | G06F 9/4411 719/324 |
| 2013/0083346 A1* | 4/2013 | Fujiki | ............... | G06F 1/3215 358/1.13 |
| 2013/0094045 A1* | 4/2013 | Nakata | ............... | G06F 3/1285 358/1.13 |
| 2013/0212602 A1* | 8/2013 | Yamazaki | ......... | H04N 1/00949 719/321 |
| 2013/0222832 A1* | 8/2013 | Osawa | ............... | G06F 3/1296 358/1.13 |
| 2013/0301071 A1* | 11/2013 | Kikuchi | ............... | G06F 3/1204 358/1.13 |
| 2014/0063541 A1* | 3/2014 | Yamazaki | ............ | G06F 3/0486 358/1.15 |
| 2014/0300914 A1* | 10/2014 | Yamazaki | ............ | G06F 3/1285 358/1.13 |
| 2014/0337729 A1* | 11/2014 | Jang | ............... | G06Q 10/00 715/716 |
| 2016/0011555 A1* | 1/2016 | Akimoto | ............ | G03G 15/502 399/81 |
| 2017/0052744 A1* | 2/2017 | Langeveld | ............ | G06F 3/1259 |
| 2018/0107438 A1* | 4/2018 | Takeuchi | ............ | G06F 3/1298 |

\* cited by examiner

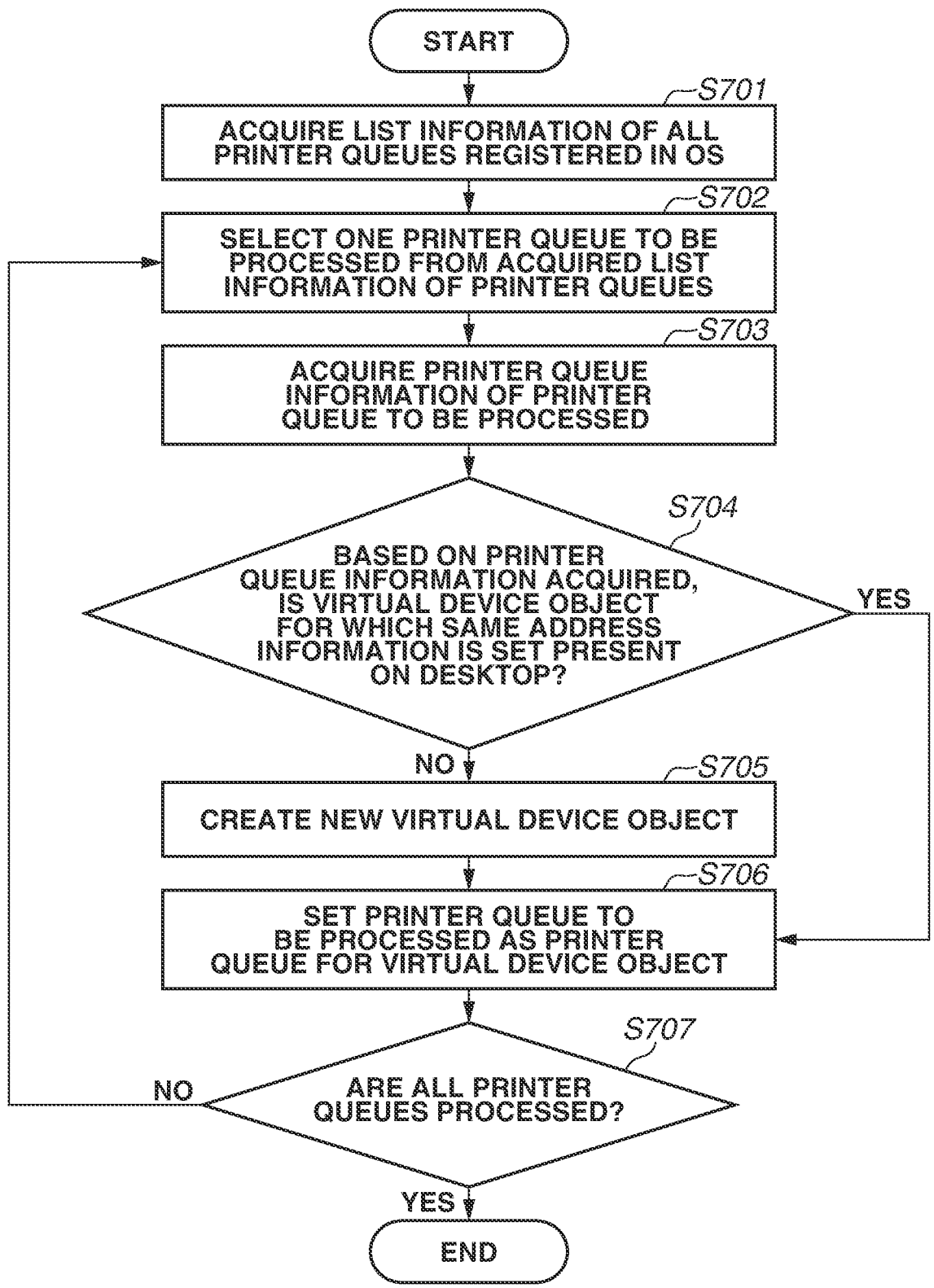

FIG.10

| Virtual Device | Printer Queue | Number of Times of Use | Use Start Time | Non-Use |
|---|---|---|---|---|
| MFP-A | MFP-A (Print) Automatic Color | 6 | 2017/10/13 3:24 PM | FALSE |
| | MFP-A (Print) Automatic Two Colors | 5 | 2017/10/13 2:26 PM | FALSE |
| | MFP-A (Print) Monochrome | 2 | 2017/10/13 1:22 PM | FALSE |
| MFP-B | MFP-B (Print) | 23 | 2017/10/1 11:59 AM | FALSE |

CLIENT APPARATUS, CONTROL METHOD, AND STORAGE MEDIUM

BACKGROUND

Field

The present disclosure relates to a client apparatus for managing and displaying a printer object, a control method, and a storage medium.

Description of the Related Art

There is a technique for integrating, into a virtual device object, various drivers (e.g., a print driver, a fax transmission driver, and a scan driver) for transmitting an output instruction to an image forming apparatus and receiving an instruction to the image forming apparatus from a user via the virtual device object. The virtual device object is an object that is associated with a printer queue and displayed on a desktop based on an operating system (OS) to enable selection of a printer queue.

In Japanese Patent Application Laid-Open No. 2013-168030, a virtual device object composed of a print printer queue and a fax transmission printer queue is provided. Document data is dragged and dropped onto the virtual device object, whereby an output instruction (e.g., printing or fax transmission) is transmitted to an image forming apparatus.

In the case of Japanese Patent Application Laid-Open No. 2013-168030, one virtual device object has only one print printer queue and one fax transmission printer queue. Thus, in the method discussed in Japanese Patent Application Laid-Open No. 2013-168030, to register a plurality of printer queues dedicated to particular settings (e.g., specialized in frequently used print settings) among print printer queues corresponding to the setting contents of the dedicated printer queues, for example, it is necessary to register a plurality of virtual device objects corresponding to the types of the setting contents. As a result, the plurality of virtual device objects is displayed on the desktop of an operating system (OS), so that the display area of the desktop is occupied by them.

SUMMARY

According to the present disclosure, it is possible to use a plurality of printer objects each corresponding to the setting content while effectively utilizing a display area of a desktop.

According to an aspect of the present disclosure, a client apparatus that transmits a job to an image forming apparatus via a printer queue generated by installing a driver on an operating system (OS) and causes the image forming apparatus to execute an output process of a document includes a first reception unit configured to receive a user operation associated with the printer queue via a virtual device object associated with a plurality of printer queues and displayed on a desktop of the client apparatus, a second reception unit configured to receive, on a first screen associated with the plurality of printer queues, a user operation for selecting a printer queue from among the plurality of printer queues, and an execution unit configured to display the first screen in response to the user operation received by the first reception unit and cause the image forming apparatus to execute the output process of the document using the printer queue selected on the first screen in response to the user operation received by the second reception unit.

Further features will become apparent from the following description of exemplary embodiments with reference to the attached drawings.

BRIEF DESCRIPTION OF THE DRAWINGS

FIG. 8 is a flowchart illustrating a setting process procedure of a printer queue.

FIG. 10 is a diagram illustrating an example of a table holding a usage state of a printer queue.

DESCRIPTION OF THE EMBODIMENTS

A first exemplary embodiment of the present disclosure is described below with reference to the drawings.

<System Configuration>

Figure 1:
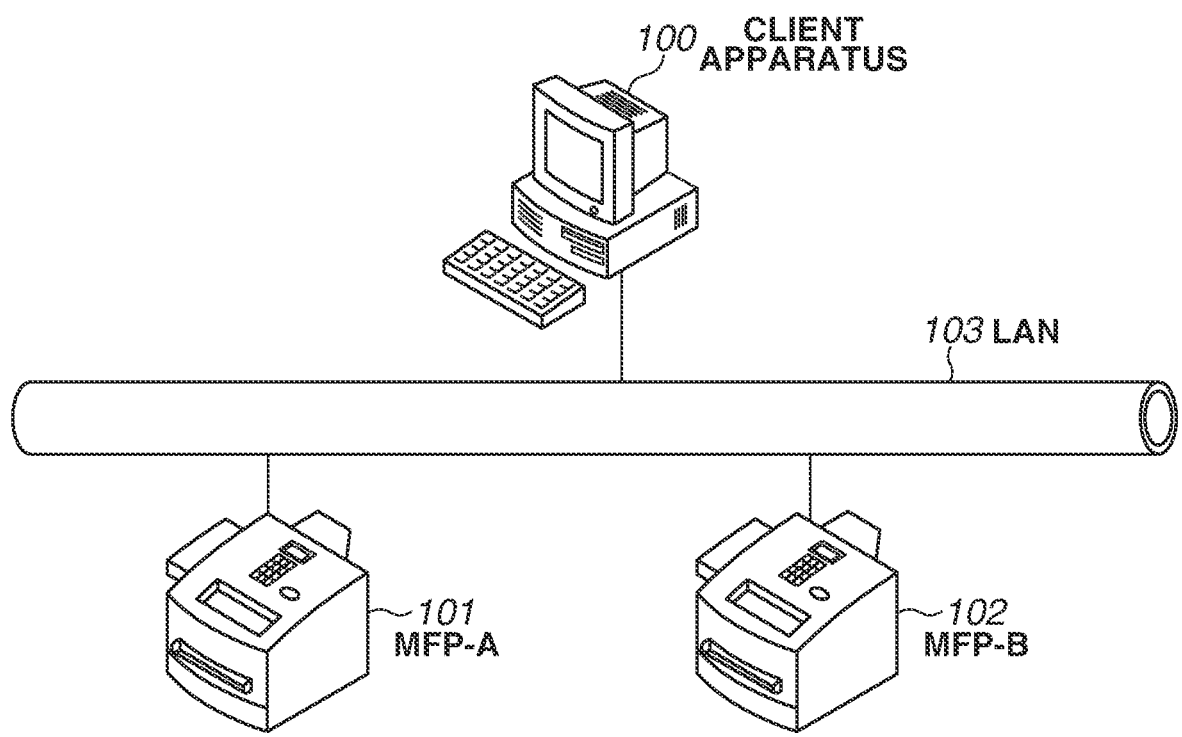
FIG. 1 is a diagram illustrating a configuration of an information processing system.

FIG. 1 is a diagram illustrating an entire information processing system. A client apparatus 100 and two image forming apparatuses (multi-function peripheral (MFP)-A 101 and MFP-B 102) are connected to a local area network (LAN) 103, which enables them to communicate with each other. In the following descriptions, in a case where the MFP-A 101 and the MFP-B 102 do not need to be particularly distinguished from each other, both MFP-A 101 and MFP-B 102 will be referred to as the image forming apparatus.

The client apparatus 100 includes an OS and various applications for executing particular functional processes. Examples of the client apparatus 100 include a personal computer (PC) and a mobile terminal. The particular functional processes include document processing, spreadsheet processing, presentation processing, image processing, and graphics processing. Each of the applications has a unique data structure. The client apparatus 100 also includes a driver and a virtual device application 410 (described below) for executing printing and fax transmission on the MFP-A 101 and the MFP-B 102. Both the MFP-A 101 and the MFP-B 102 include a print function, a fax function, a copy function, a scanner function, and a file transmission function, and execute the printing or the fax transmission in response to an instruction from the client apparatus 100.

<Hardware Configuration of Client Apparatus>

Figure 2:
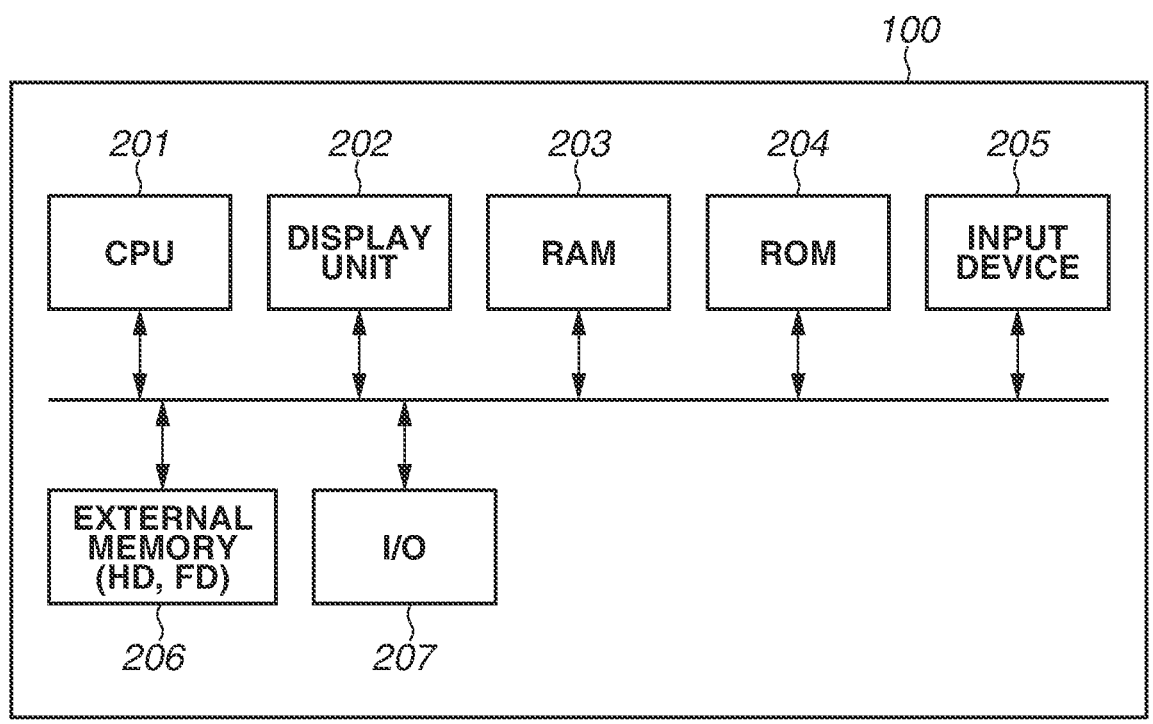
FIG. 2 is a block diagram illustrating a hardware configuration of a client apparatus.

FIG. 2 is an example of a hardware configuration diagram of the client apparatus 100 illustrated in FIG. 1. The client apparatus 100 includes an input device 205 such as a keyboard and a pointing device for receiving a user operation, a display unit 202 that provides visual output information feedback, a random access memory (RAM) 203 that is a storage device for storing various programs and execution information, an external memory 206 such as a hard disk drive (HDD) and a flexible disk drive (FDD), and a read-only memory (ROM) 204.

The client apparatus 100 also includes an interface device input/output (I/O) 207 for communicating with an external device, and a central processing unit (CPU) 201 that executes the programs. The client apparatus 100 connects to a peripheral device such as the MFP-A 101 and the MFP-B 102 via the I/O 207 using wired or wireless communication.

<Hardware Configuration (Image Forming Apparatus)>

Figure 3:
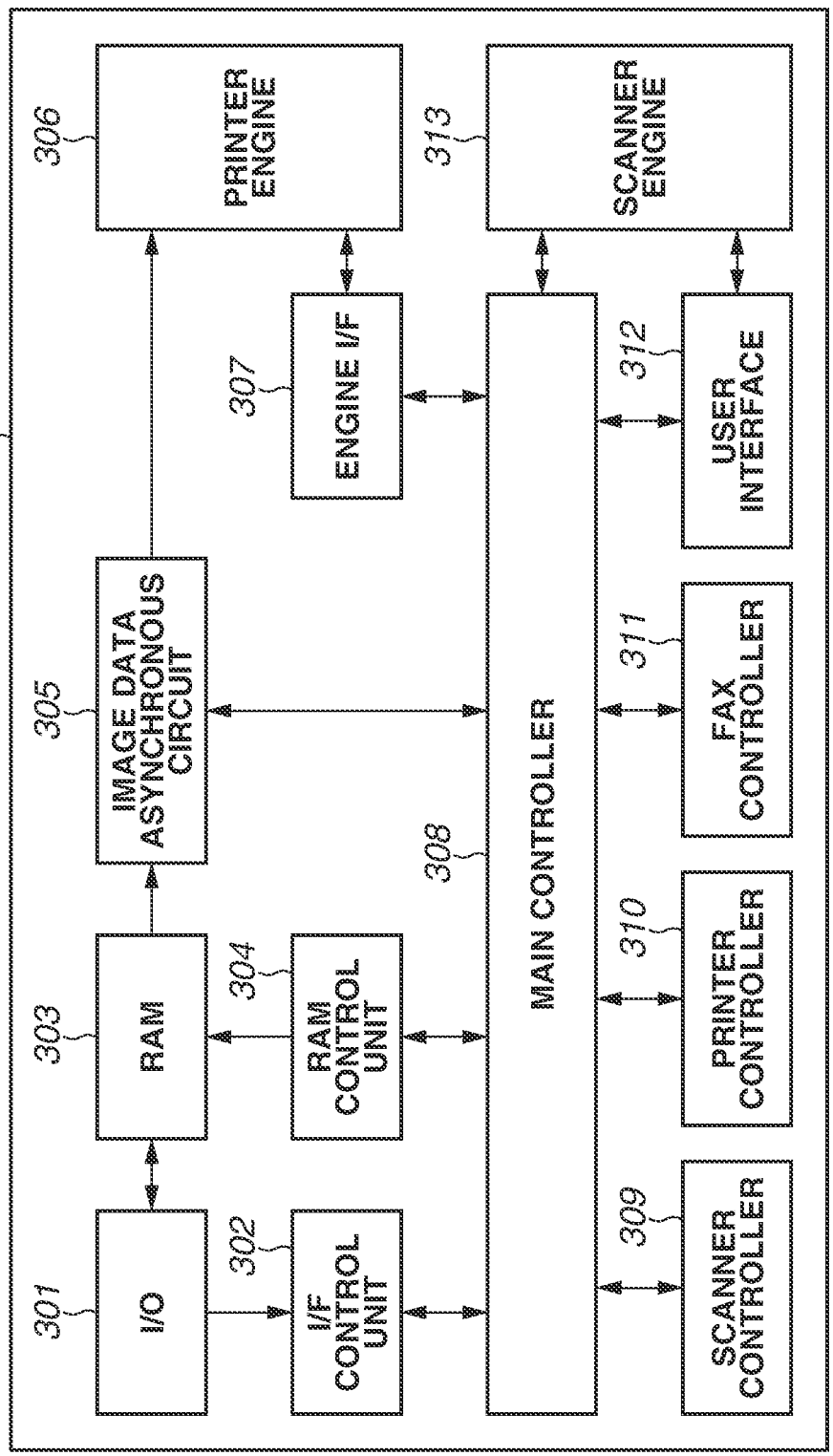
FIG. 3 is a block diagram illustrating a hardware configuration of an image forming apparatus.

FIG. 3 illustrates an example of a hardware configuration diagram of the MFP-A 101 and the MFP-B 102. In the present exemplary embodiment, an image forming apparatus (MFP) having a scanner function, a print function, and a fax transmission function is used as an example in descriptions below. While the descriptions are provided using the MFP-A 101 as an example, the MFP-B 102 has a similar configuration.

An I/O 301 connects to the client apparatus 100 via a communication medium such as the LAN 103. To support a plurality of connection forms, a plurality of I/Os 301 can be provided. The MFP-A 101 transmits a device identification (ID) for uniquely identifying the image forming apparatus and a scan image to the client apparatus 100 via the/O 301. The MFP-A 101 receives various control commands from the client apparatus 100 via the I/O 301 and performs processing.

An interface (I/F) control unit 302 performs control to issue the device ID for identifying the MFP-A 101. A RAM 303 is a primary storage device in which external data such as a control command acquired via the I/O 301 and an image read by a scanner engine 313 are stored. The RAM 303 also stores an image that is rasterized by a printer controller 310 and not yet transmitted to a printer engine 306.

A RAM control unit 304 manages allocation of the RAM 303. An image data asynchronous circuit 305 outputs an image that is captured by the printer controller 310 or by the scanner engine 313 and is rasterized by the RAM control unit 304 corresponding to rotation of the printer engine 306. The printer engine 306 is a device that develops an image on an output medium such as paper.

A main controller 308 performs various types of control on the printer engine 306 via an engine I/F 307, thereby controlling the MFP-A 101. For example, the main controller 308 performs a process for appropriately distributing a control language received from the client apparatus 100 via the I/O 301 to a scanner controller 309, the printer controller 310, and a fax controller 311. The main controller 308 receives an instruction from each of the controllers 309 to 311 and a user interface 312, and controls the printer engine 306 and the scanner engine 313. The main controller 308, as a result of using a unified control interface with each of the controllers, can process a plurality of types of control commands using a single peripheral device. The main controller 308 also acquires, from each of the controllers, a device ID of an extension controller currently provided in the controller and manages the acquired device ID.

The scanner controller 309 converts a scan control command received from the client apparatus 100 into an execution command that is acceptable by the main controller 308. The scanner controller 309 converts an image read by the scanner engine 313 into a scan control command.

The printer controller 310 converts a page description language (PDL) received from the client apparatus 100 into an execution command including a rasterized image of a PDL that is acceptable by the main controller 308. The rasterized image is transmitted to the printer engine 306 and is printed on an output medium such as paper.

The fax controller 311 converts a fax control language received from the client apparatus 100 into an image, and transfers the image to another fax apparatus or Internet Protocol (IP) fax via a public telephone line (not illustrated) or the Internet. The user interface 312 receives input and output operated by a user to make various settings of the main controller 308 and to execute the scanner function, the print function, and the fax transmission function on the MFP-A 101. The scanner engine 313 reads an image using an optical device (not illustrated) in response to an instruction from the main controller 308, converts the image into an electric signal, and transmits the electric signal to the main controller 308.

<Software Configuration Diagram of Virtual Device Application>

Figure 4:
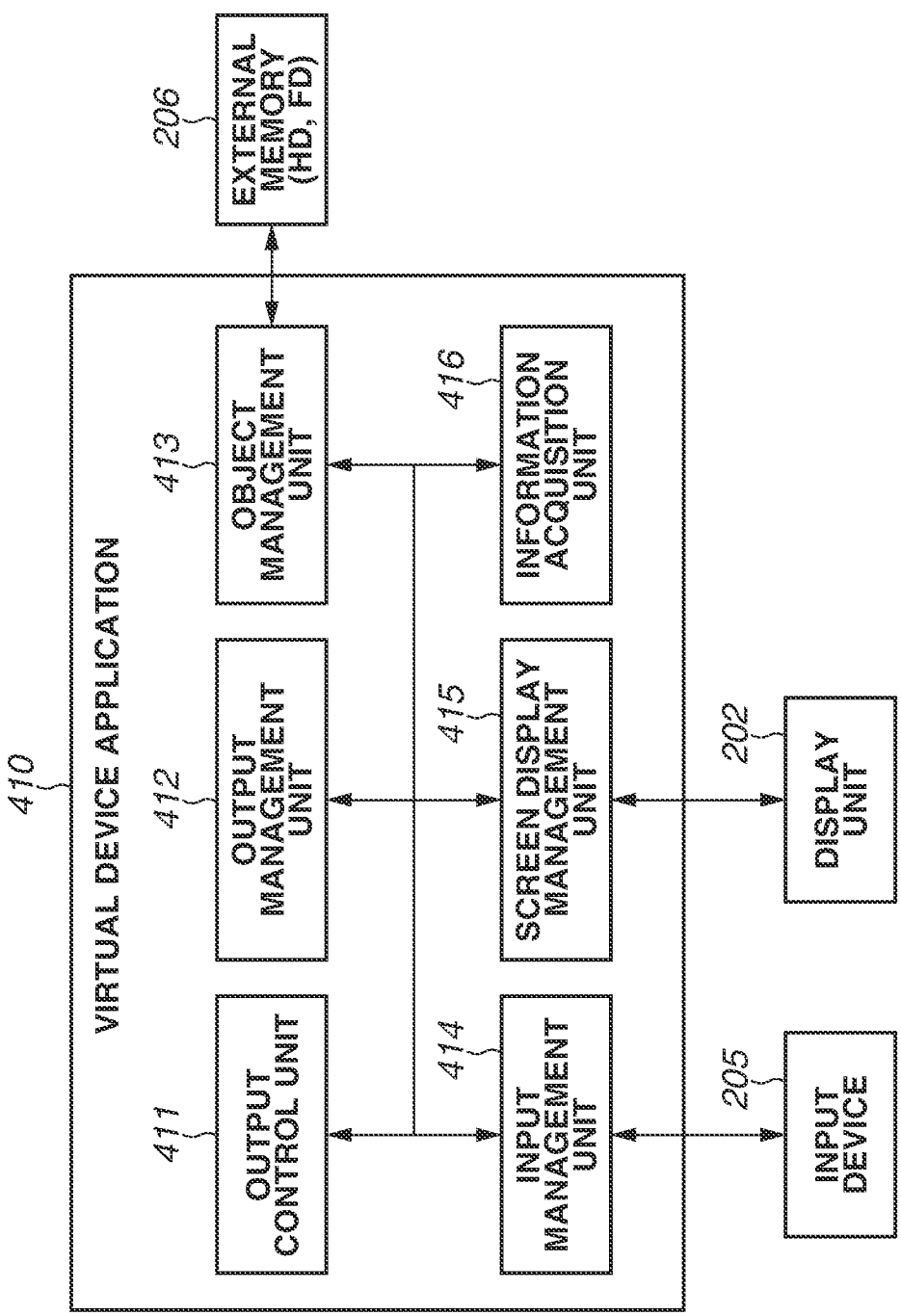
FIG. 4 is a block diagram illustrating a software configuration of a virtual device application.

FIG. 4 is a diagram illustrating an example of a software configuration of a virtual device application 410 included in the client apparatus 100. The virtual device application 410 is an application for collectively displaying a plurality of printer queues managed by the OS in a single virtual device object, and controlling output in response to a user operation performed on the virtual device object.

The virtual device application 410 includes an output control unit 411, an output management unit 412, an object management unit 413, an input management unit 414, a screen display management unit 415, and an information acquisition unit 416.

The output control unit 411 instructs the image forming apparatus to provide an output. More specifically, if receiving an output instruction provided by a user operation via the input management unit 414, then based on the received output instruction, the output control unit 411 transmits, to the OS, an output instruction for a printer queue. The OS, which has received the output instruction, calls a driver set for the printer queue to transmit an output instruction to the image forming apparatus or displays a graphical user interface (GUI), which is a screen on which a user can make an output setting. In a case where the received output instruction is a print instruction, the output control unit 411 transmits an output instruction to a print printer driver. In a case where the received output instruction is a fax transmission instruction, the output control unit 411 transmits an output instruction to a fax transmission printer driver.

Receiving the output instruction, the driver converts document data specified by the output instruction into output instruction information that is acceptable by the image forming apparatus. Examples of the data format of the output instruction information include a PDL format in the case of printing, and a raster format in the case of fax transmission. Then, the driver transmits the converted output instruction information to the image forming apparatus via the network 103.

Figure 6:
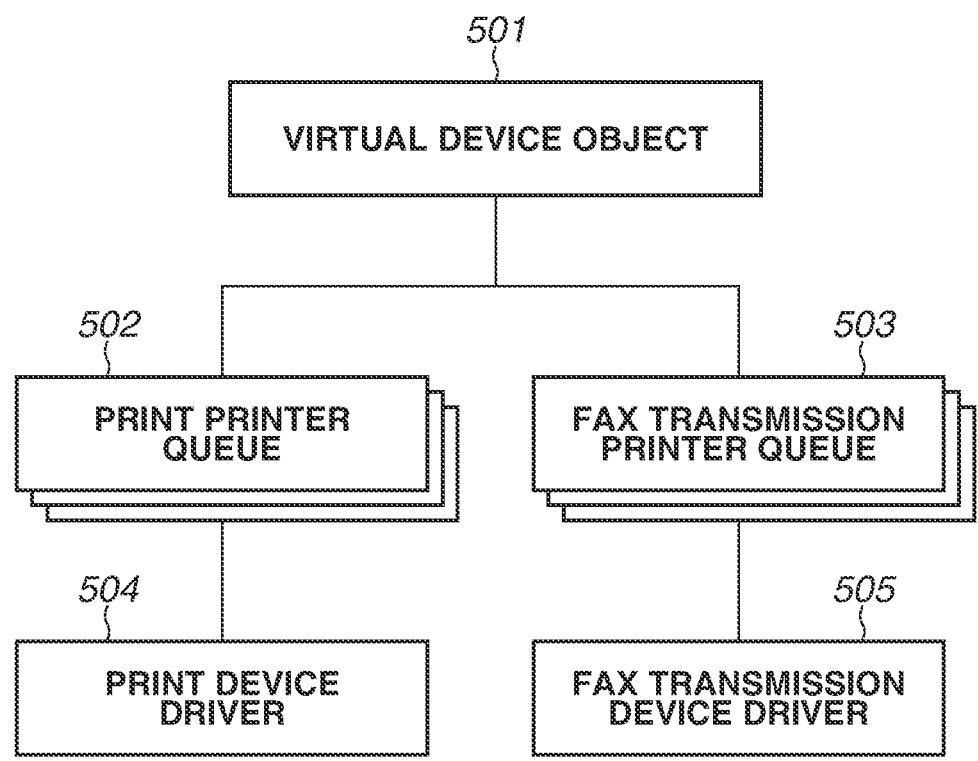
FIG. 6 is an image diagram illustrating a configuration of a virtual device object.

With reference to FIG. 6, a relationship between a printer queue and a driver is described. FIG. 6 is a diagram schematically illustrating a virtual device object configured in the virtual device application 410. A virtual device object

501 is a user interface (UI) on a desktop that is associated with a plurality of printer queues that are printer objects. The virtual device object 501 according to the present exemplary embodiment is also associated with, in addition to the printer queues, a function executed without transmission to the image forming apparatus, such as a Portable Document Format (PDF) conversion function, and is achieved as a single UI.

In FIG. 6, print printer queues 502 and fax transmission printer queues 503 are examples of the printer queues associated with the virtual device object 501.

If receiving an output instruction, one of the print printer queues 502 transmits an output instruction to a print device driver 504 associated with the print printer queue 502. The output instruction includes a file as a print target and a print setting. The relationship between a printer queue and a device driver is similar in the case of fax transmission.

Figure 5:
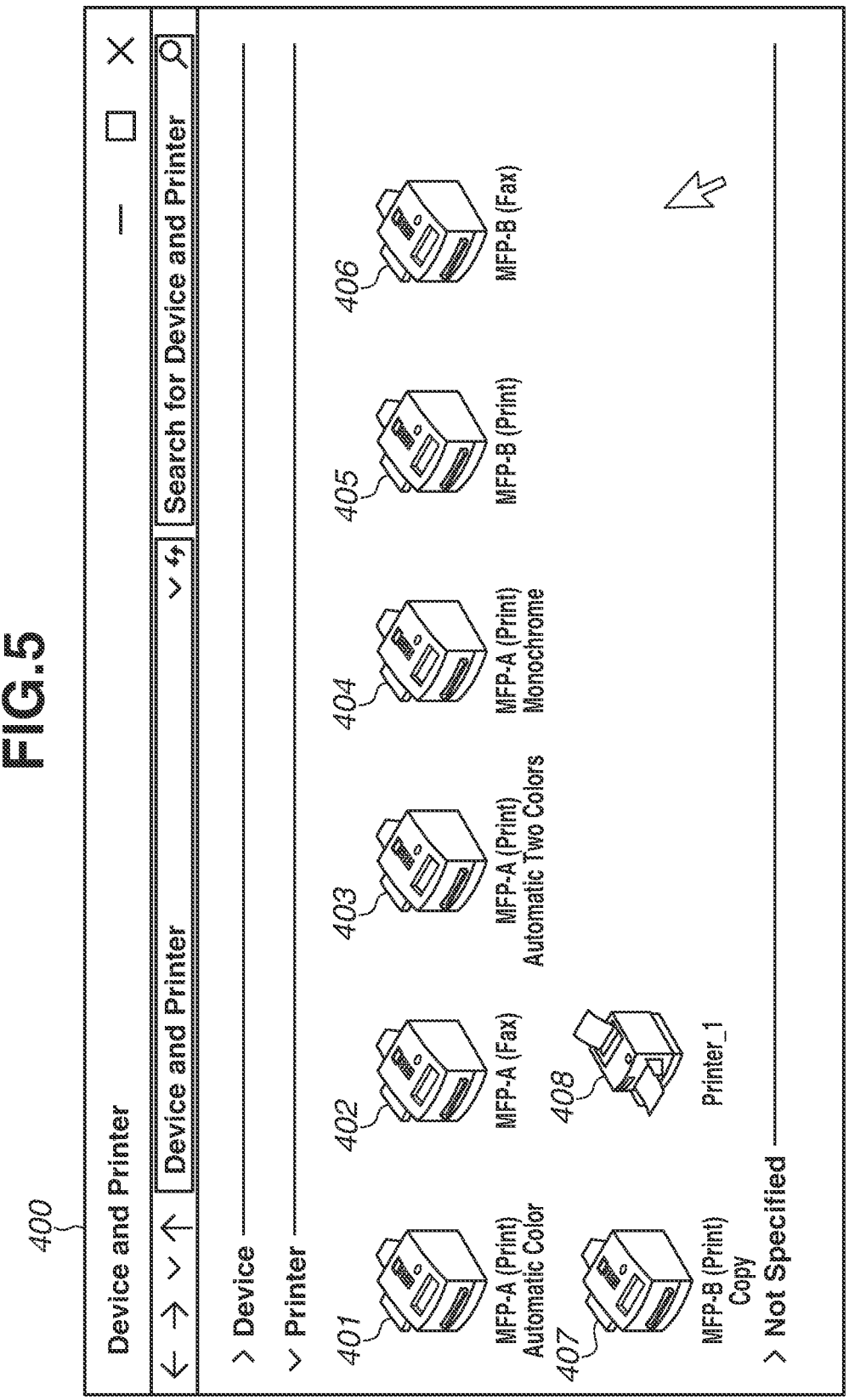
FIG. 5 is a diagram illustrating a printer object management screen of an operating system (OS).

The print printer queues 502 or the fax transmission printer queues 503 set for the single virtual device object 501 correspond to an output to one MFP. More specifically, since the descriptions are provided using the MFP-A 101 and the MFP-B 102 as examples in the present exemplary embodiment, there are two virtual device objects 501 as the virtual device object 501 illustrated in FIG. 6. FIG. 6 illustrates an example where three print printer queues 502 and three fax transmission printer queues 503 are present. However, in the case of the MFP-A 101, as illustrated in FIG. 5, the single virtual device object 501 is composed of three print printer queues 502 and a fax transmission printer queue 503.

Referring back to FIG. 4, the output management unit 412 communicates with the image forming apparatus and acquires status information of the image forming apparatus and status information of a job to be executed. The output management unit 412 also acquires job information in a spool process executed by a printer queue and processed by the OS.

The job information (e.g., status indicating a progress state of the job such as "IN PROCESS" and "COMPLETED") acquired by the output management unit 412 is reflected and displayed on a GUI (described below) of the virtual device object 501.

The object management unit 413 generates and manages configuration information about the virtual device object 501. The configuration information about the virtual device object 501 is information including a name and settings of the virtual device object 501. Based on information about a printer queue acquired by the information acquisition unit 416, the object management unit 413 generates configuration information about the virtual device object 501. The generated configuration information is written to or read from a setting file saved in the external memory 206 by the object management unit 413.

The input management unit 414 detects a user operation on the input device 205 via a GUI of the virtual device application 410 displayed by the screen display management unit 415 and acquires operation information of the user.

The screen display management unit 415 performs screen display control for displaying a GUI of the virtual device application 410 and receiving a user operation on the GUI.

The information acquisition unit 416 acquires information such as information about a printer queue and information about a printer driver that are managed by the OS, and address information of an image forming apparatus associated with the printer queue and the printer driver.

<Printer Object Management Screen of OS>

FIG. 5 is an example of a printer object management screen of the OS.

Figure 13:
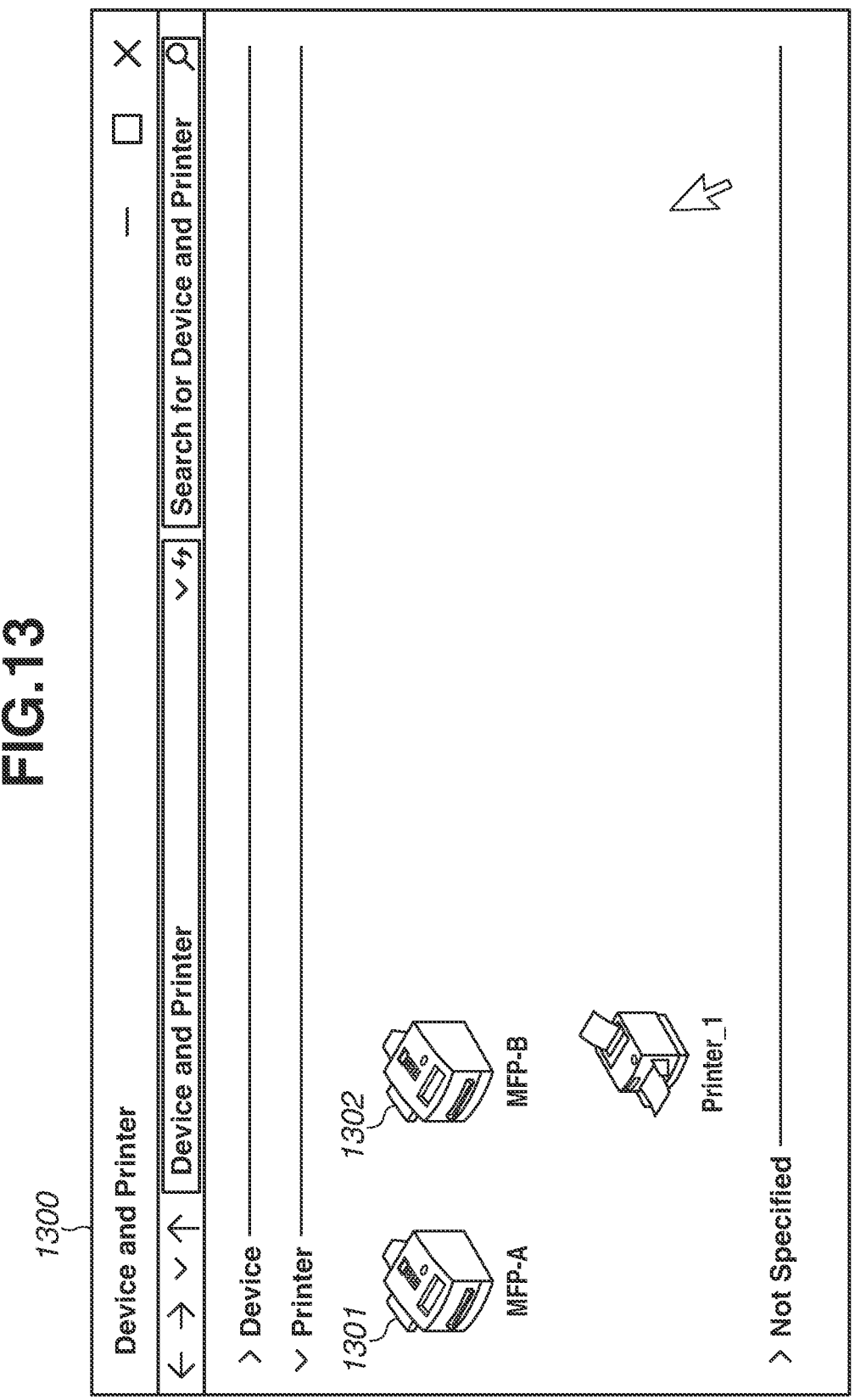
FIG. 13 is a diagram illustrating a printer queue management screen based on the OS.

On a printer object management screen 400, a printer object of a printer queue registered in the OS is displayed. If the print device driver 504 or a fax transmission device driver 505 is registered in the OS, a printer queue for providing an output to the image forming apparatus via the registered driver is registered. FIG. 13 illustrates an example of a management screen 1300 immediately after the driver is registered. In FIG. 13, a printer object 1301 of the MFP-A 101 and a printer object 1302 of the MFP-B 102 are displayed. FIG. 5 illustrates a result of making a particular print setting for the printer object by a user operation and registering the particular print setting as an independent printer object. FIG. 5 illustrates printer objects 401 to 408 of registered printer queues. The operation of setting each of the printer objects 401 to 408 with each print setting is a generally known method, thus it is not described here.

For example, the printer object 401 is a printer object having the name "MFP-A (Print) Automatic Color" and is used to execute printing in an automatic color mode on the MFP-A 101. The printer object 406 is a printer object having the name "MFP-B (Fax)" and is used to execute fax transmission on the MFP-B 102. As described above, different setting contents are set for the respective printer objects. This enables a different printer object to be appropriately selected and used depending on a purpose of use. For example, in a case where full-color printing is performed, the printer object 401 is used. This saves the trouble of making a print setting each time printing is executed.

<UI Displayed when Output of Virtual Device Application is Executed>

Figure 7A:
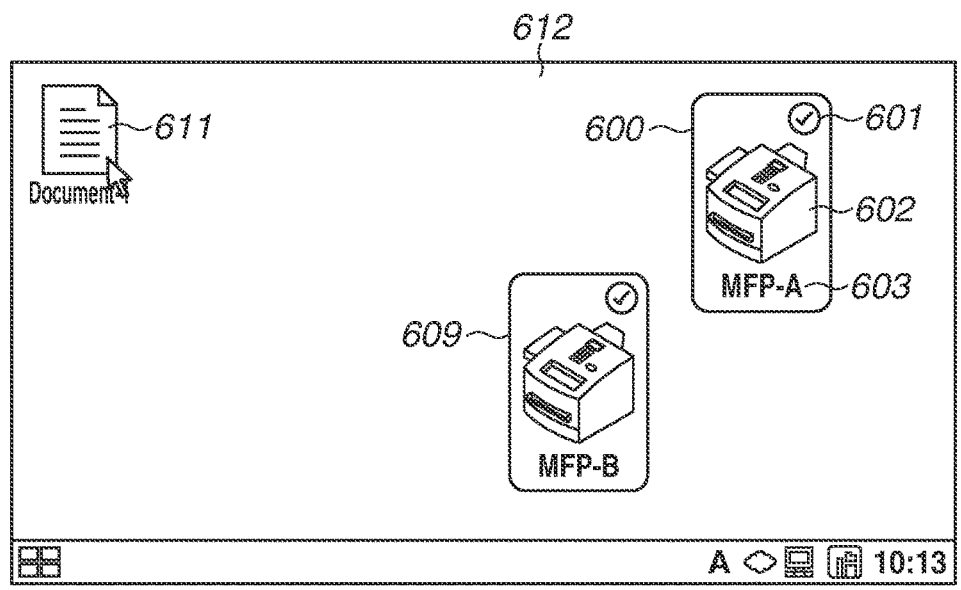
FIGS. 7A, 7B, and 7C are diagrams illustrating an example of display of virtual device objects.
Figure 7B:
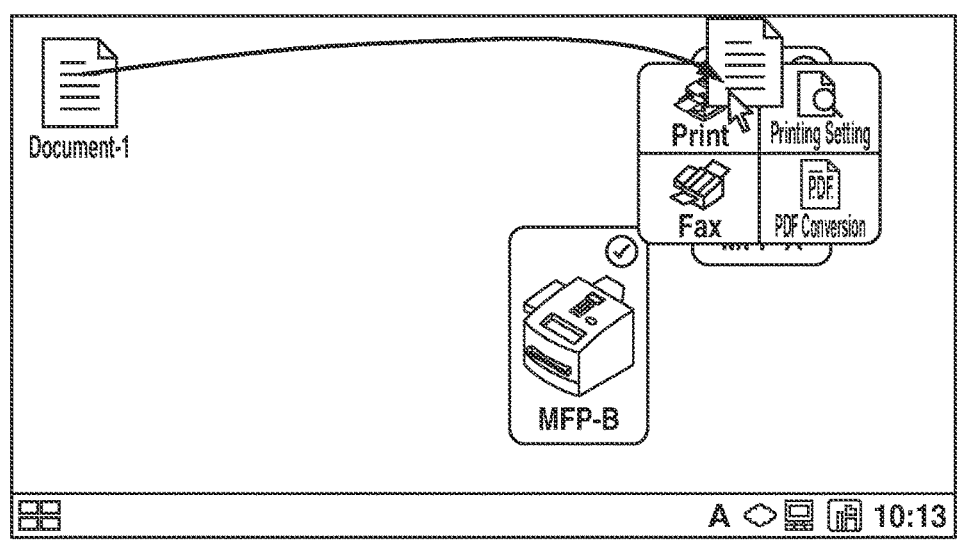
Figure 7C:
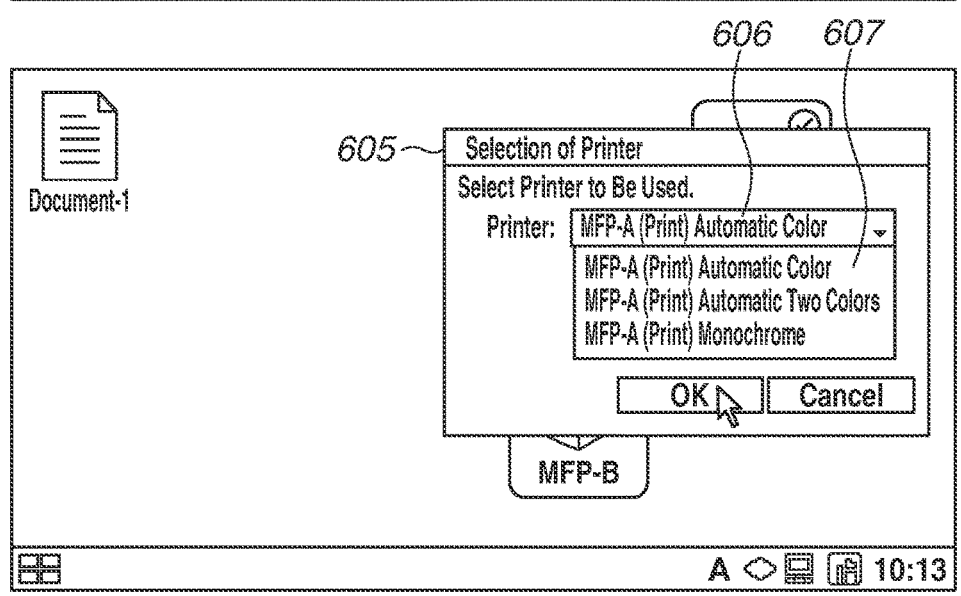

FIGS. 7A, 7B, and 7C illustrate the state where a virtual device object 600 of the MFP-A 101 and a virtual device object 609 of the MFP-B 102 are displayed on the desktop by the virtual device application 410. While the descriptions are provided below using the virtual device object 600 as an example for convenience of description, the same applies to the virtual device object 609.

While the OS of the client apparatus 100 is operating, the virtual device application 410 operates as a resident program and displays the virtual device object 600. A form can be employed in which the virtual device object 600 is not displayed and is in a closed state in a case where the virtual device object 600 is not used, and the virtual device object 600 is displayed again when the virtual device object 600 is used. FIG. 7A illustrates an example of the virtual device object 600 that is being displayed.

The virtual device object 600 includes a status icon 601, an image 602, and a name 603. The status icon 601 is an icon indicating a status of the MFP-A 101 (e.g., printing can be performed, or occurrence of an error or a warning) and is displayed as an icon corresponding to the status of the MFP-A 101.

The image 602 is an image representing the MFP-A 101. The name 603 indicates the name of the MFP-A 101. The image 602 and the name 603 can be set and changed in advance by the user. A document 611 is an example of document data placed on a desktop 610. The document 611 can also be stored in any location other than the desktop 610.

The virtual device object 600 receives a user operation on a file and executes various output processes in response to the user operation. In the present exemplary embodiment, descriptions are provided using a drag-and-drop operation as an example of the user operation. FIG. 7B illustrates a state where the document 611 is dragged onto the virtual device object 600. FIG. 7B illustrates the state where the output of the virtual device application 410 is executed. An output menu 604 is displayed as a result of moving the document

611 onto the virtual device object 600 by a drag operation. In the output menu 604, functions such as a "Print" function for executing printing, a "Print Setting" function for displaying a print preview and a print setting of the print preview, a "Fax Transmission" function for executing fax transmission, and a "PDF Conversion" function for converting a file into a PDF file are displayed. The document 611 is dropped onto the display of the desired function by a user operation, whereby the virtual device application 410 executes processing corresponding to the display of the function.

For example, in a case where the document 611 is dropped onto "Print", an output process is executed using a print printer queue 502 set for the virtual device object 501. In a case where a file is dropped onto "Fax Transmission", fax transmission is executed using a fax transmission printer queue 503. In this case, as the output setting of printing or fax transmission, a print setting set in advance as the printer queue may be used. Alternatively, a configuration may be employed in which a UI (not illustrated) for making a print setting is displayed. The "PDF Conversion" function and the "Print Setting" function described in the output menu 604 are functions executed without using a printer queue, and therefore are not described in the present exemplary embodiment.

FIG. 7C illustrates the state where in a case where a plurality of print printer queues 502 is set for the virtual device object 600, a selection screen 605 for selecting one of the print printer queues 502 is displayed.

On the selection screen 605, the print printer queues 502 set for the virtual device object 600 can be displayed in a list 607, and a print printer queue 502 to be used can be selected from the list 607. The virtual device application 410 executes printing using the selected print printer queue 502. In this case, for the virtual device object 600, a plurality of print printer objects "MFP-A (Print) Automatic Color", "MFP-A (Print) Automatic Two Colors", and "MFP-A (Print) Monochrome" is set. The print printer queues 502 correspond to the printer objects 401, 403, and 404 illustrated in FIG. 5.

While not illustrated, in the case of the virtual device object 609, a list includes a plurality of print printer objects "MFP-B (Print)" and "MFP-B (Print) Copy", and the print printer objects correspond to the printer objects 405 and 407 illustrated in FIG. 5.

<Flow of Process for Setting Printer Queue for Virtual Device Object>

With reference to FIG. 8, a description is provided of a process for setting a printer queue for the virtual device object 501. Steps of the process are achieved by the CPU 201 loading the virtual device application 410 and a driver that are stored in the ROM 204 and the external memory 206 into the RAM 203 and executing the virtual device application 410 and the driver. The processing in FIG. 8 is started using, as a trigger, receipt of a start instruction by the virtual device application 410.

First, in step S701, the information acquisition unit 416 acquires list information of all printer queues registered in the OS. The list information acquired by the information acquisition unit 416 includes at least names of the printer queues.

In step S702, the object management unit 413 selects one printer queue as a printer queue to be processed from the acquired list information of the printer queues. In step S703, the object management unit 413 transmits, to the information acquisition unit 416, an acquisition request to acquire printer queue information of the printer queue to be processed selected in step S702, and acquires the printer queue information. The printer queue information is information including at least the type of output (e.g., printing and fax transmission) of the printer queue and address information of an output destination device of the printer queue.

When acquiring the type of output, specifically, the object management unit 413 determines whether the type of output is printing or fax transmission via an interface (IF) of a driver. The IF is provided as a software development kit (SDK) of the driver for external cooperation. Thus, the object management unit 413 can determine the type of output via the SDK. When acquiring the address information of the output destination device, the object management unit 413 references output port information of the printer queue and acquires the address information of the output destination device.

In step S704, the object management unit 413 references the printer queue information acquired in step S703 and determines whether a virtual device object for which the same address information is set is present on the desktop. If it is determined that the virtual device object for which the same address information is set is present (YES in step S704), the processing proceeds to step S706. If it is determined that the virtual device object for which the same address information is set is not present (NO in step S704), then in step S705, the object management unit 413 creates a new virtual device object.

If it is determined, in step S704, that the virtual device object for which the same address information is set is present (YES in step S704), then in step S706, the object management unit 413 sets the printer queue to be processed as a printer queue for the virtual device object 501. If it is determined that the virtual device object for which the same address information is set is not present (NO in step S704), the object management unit 413 creates a new virtual device object (step S705) and then executes the process of step S706.

In step S707, the object management unit 413 determines whether all the printer queues in the list of the printer queues acquired in step S701 are processed. If there is a printer queue that has not been processed yet (NO in step S707), the processing returns to step S702. Then, the processes of steps S702 to S706 are repeated until processing on all the printer queues is completed. If all the printer queues are processed (YES in step S707), the processing ends.

The processing in FIG. 8 has been described above. By this processing, when the virtual device application 410 initially starts, it is possible to set a plurality of printer queues for a single virtual device object.

<Flow of Output Execution Process>

Figure 9:
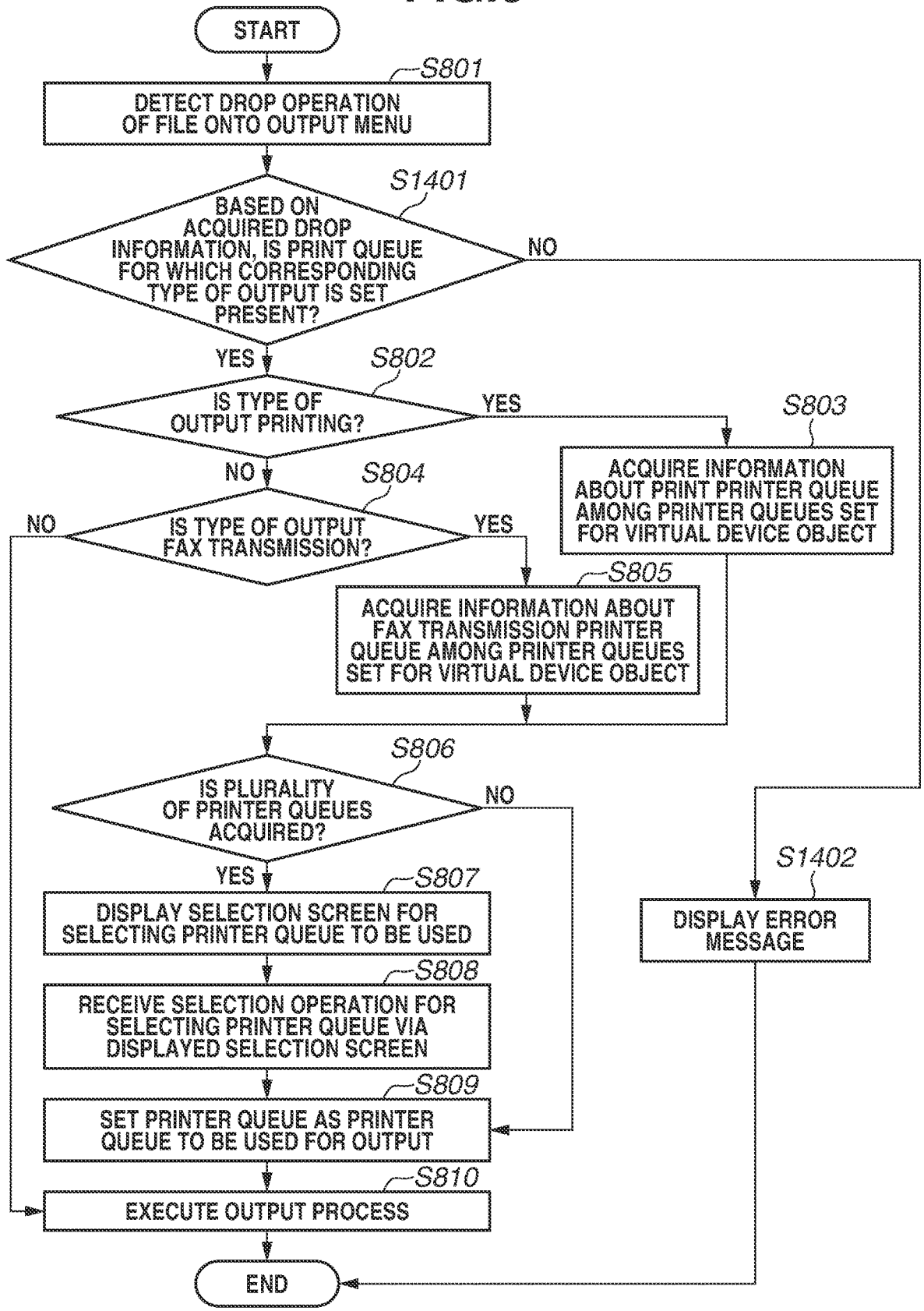
FIG. 9 is a flowchart illustrating a procedure for an output process by the virtual device application.

With reference to FIG. 9, a description is provided of processing performed when the output of the virtual device object 501 is executed.

First, in step S801, the screen display management unit 415 detects a drop operation of a file onto the output menu 604 of the virtual device object 501, and transmits drop information to the output control unit 411. The drop information is information to be transmitted to the output control unit 411 through the drop operation and includes information specifying the type of output.

In step S1401, based on the acquired drop information, the output control unit 411 determines whether a print queue for which the corresponding type of output is set is present. More specifically, the output control unit 411 makes the determination by acquiring, via the object management unit 413, printer queue information of printer queues set for the virtual device object 501. If it is determined that the print queue for which the corresponding type of output is set is present (YES in step S1401), the processing proceeds to step S802. If it is not determined that the print queue for which the corresponding type of output is set is present (NO in step S1401), the processing proceeds to step S1402.

Figure 14:
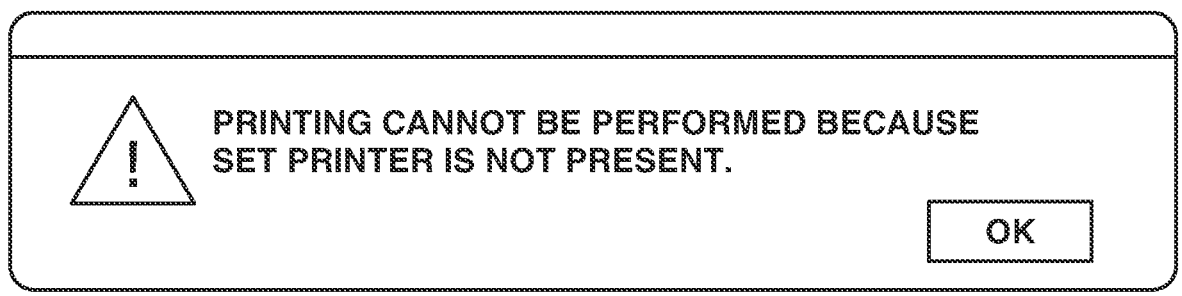
FIG. 14 is a diagram illustrating an example of an error message.

In step S1402, the screen display management unit 415 displays an error message to the user. FIG. 14 illustrates an example of the error message displayed at this time. For example, if a drop operation is executed on "Print" in the output menu 604 in step S801 and a printer queue for which the print function is set is not present, a message indicating that printing cannot be executed because a corresponding printer queue is not present (FIG. 14) is displayed.

In the present exemplary embodiment, the form has been described in which, even if the corresponding printer queue is not present, the display of the output menu 604 is not changed. However, the present disclosure is not limited to this form. For example, a form is also possible in which, based on information of a printer queue acquired in advance, a corresponding function is hidden or grayed out in the output menu 604.

In step S802, the output control unit 411 references the drop information received in step S801 and determines whether the type of output is printing. The type of output is determined based on a drop destination in the output menu 604. If it is determined that the type of output is printing (YES in step S802), the processing proceeds to step S803. If it is determined that the type of output is not printing (NO in step S802), the processing proceeds to step S804.

If it is determined, in step S802, that the type of output is not printing (NO in step S802), then in step S804, the output control unit 411 determines whether the type of output is fax transmission. If it is determined that the type of output is fax transmission (YES in step S804), the processing proceeds to step S805. If it is determined that the type of output is not fax transmission (NO in step S804), then in step S810, the output control unit 411 executes an output process. The output process executed if it is determined that the type of output is not fax transmission is an output process other than printing and fax transmission, such as a file conversion process for converting a file into a format such as the PDF.

The order of the processes of steps S802 and S804 can be reversed, and processing content, the order, and the number of steps can be changed depending on the setting content.

If it is determined in step S802 that the type of output is printing (YES in step S802), then in step S803, the output control unit 411 acquires, via the object management unit 413, information about a print printer queue 502 from among the printer queues set for the virtual device object 501. The information about the printer queue acquired at this time includes information (e.g., name of the printer queue) used to display the selection screen 605 described below.

If it is determined in step S804 that the type of output is fax transmission (YES in step S804), then in step S805, the output control unit 411 acquires, via the object management unit 413, information about a fax transmission printer queue 503 among the printer queues set for the virtual device object 501.

After acquiring the information about the print printer queue 502 (step S803) or the information about the fax transmission printer queue 503 (step S805), then in step S806, the output control unit 411 determines whether a plurality of printer queues is acquired. If it is determined that the plurality of printer queues is acquired (YES in step S806), the processing proceeds to step S807. If it is determined that the plurality of printer queues is not acquired (NO in step S806), the selection screen 605 is not displayed, and the processing proceeds to step S809.

If it is determined, in step S806, that the plurality of printer queues is acquired (YES in step S806), then in step S807, using the information about the plurality of printer queues acquired in step S803 or S805, the output control unit 411 instructs the screen display management unit 415 to display the selection screen 605 for selecting a printer queue. The example of the selection screen 605 displayed at this time is illustrated in FIG. 7C. In step S808, the output control unit 411 receives, via the selection screen 605, a selection operation of a printer queue performed by the user.

After it is determined, in step S806, that a plurality of printer queues is not acquired, or after a user operation is received in step S808, then in step S809, the output control unit 411 sets the printer queue as a printer queue to be used for output. In step S810, the output control unit 411 executes an output process using the set printer queue.

By the processing in FIG. 9, the selection screen 605 can be displayed in response to the number of print printer queues 502 or fax transmission printer queues 503 set for the virtual device object 501, and an output process can be executed based on a user operation on the selection screen 605.

According to the present exemplary embodiment, a plurality of printer queues can be set for a single virtual device object. As a result, it is possible to execute an output process effectively utilizing a display area of a desktop and corresponding to the setting content of a selected printer queue.

The user may not be necessarily using all of the plurality of printer objects registered for the same image forming apparatus. For example, a form is possible in which, as a result of registering a driver again or registering a driver with a different PDL, a printer queue that has originally been present is not used any more. If such an unused printer queue is displayed each time as a candidate for selection on the selection screen 605, operability can decrease such that the user erroneously selects the unused printer queue.

In a second exemplary embodiment, a form is described in which it is determined whether the printer queue is used or unused based on the usage state of a printer queue for the virtual device object 501, and only a printer queue that is being used is displayed as a candidate on the selection screen 605. Components and processes that are similar to those in the first exemplary embodiment will not be described.

<Printer Queue Usage State Table>

FIG. 10 is an example of a printer queue usage state table 900, which is a table for managing the usage state of a printer queue set for the virtual device object 501. The printer queue usage state table 900 includes, as items, a virtual device 901, a printer queue 902, a number of times of use 903, a use start time 904, and non-use 905.

The virtual device 901 refers to a virtual device object 501 created by the virtual device application 410. The printer queue 902 refers to a printer queue set for the virtual device 901.

The number of times of use 903 is the number of times the printer queue 902 is used to execute a job that is transmitted to the image forming apparatus. The use start time 904 is the time when a job is transmitted to the printer queue 902 for the first time after the virtual device 901 is generated. By processing described below, the use start time 904 is updated or set.

The non-use 905 is a setting value set as a result of executing the processing described below based on the number of times of use 903 and the use start time 904, and indicates whether the printer queue 902 is unused. For example, if it is determined that the printer queue 902 is unused, the setting value of the non-use 905 is "TRUE". If it is determined that the printer queue 902 is not unused, the setting value of the non-use 905 is "FALSE".

For example, in the case of an "MFP-A", which is a virtual device 901, the number of times of use 903 of "MFP-A (Print) Automatic Color", which is one of printer queues 902 set for the "MFP-A", is six times. The use start time 904 of the printer queue 902 is "2017/10/13 3:24 PM". Then, the setting value of the non-use 905 of the printer queue 902 is "FALSE". Thus, it is understood that the printer queue "MFP-A (Print) Automatic Color" is being used.

Depending on the use start time 904 or the number of times of use 903, the setting value "FALSE" of the non-use 905 of the printer queue 902 can be set to "TRUE" by the processing described below.

<Flow of Monitoring Process for Monitoring Printer Object>

Figure 11:
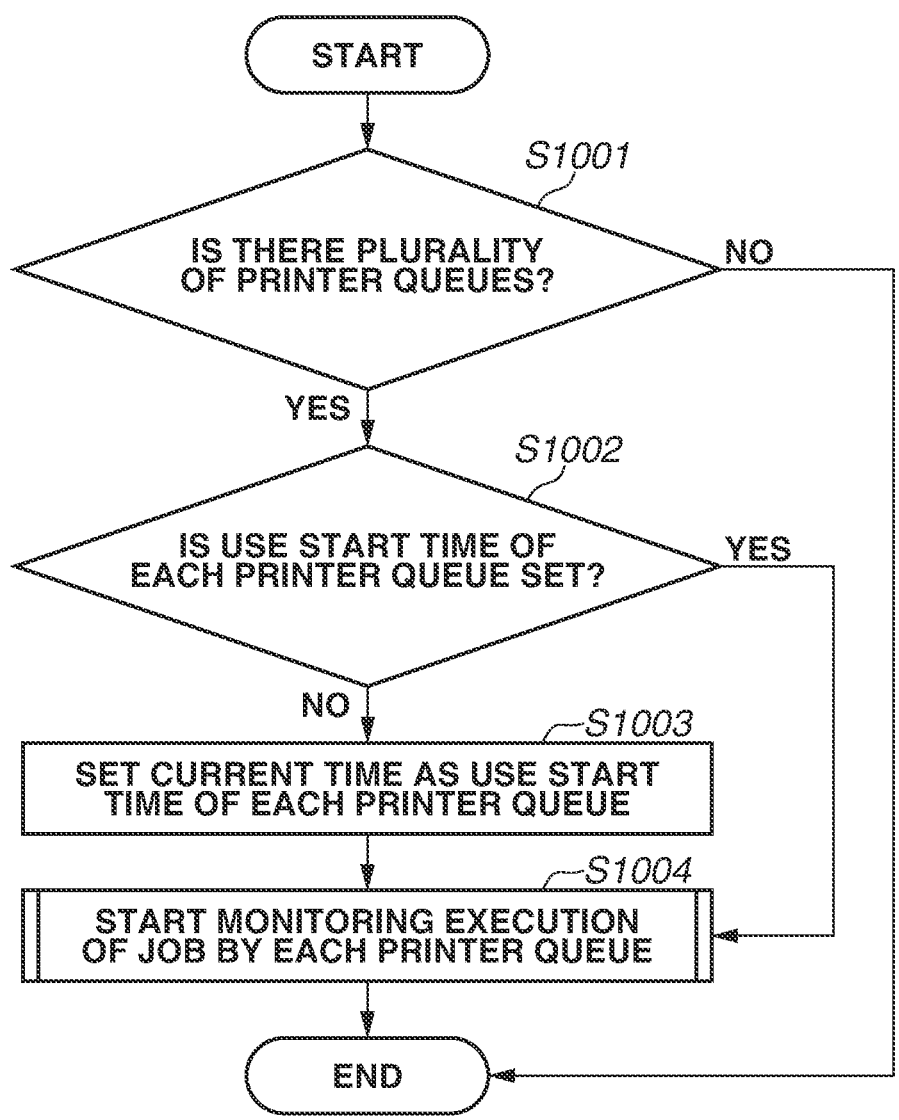
FIG. 11 is a flowchart illustrating a monitoring process of a printer queue by the virtual device application.
Figure 12:
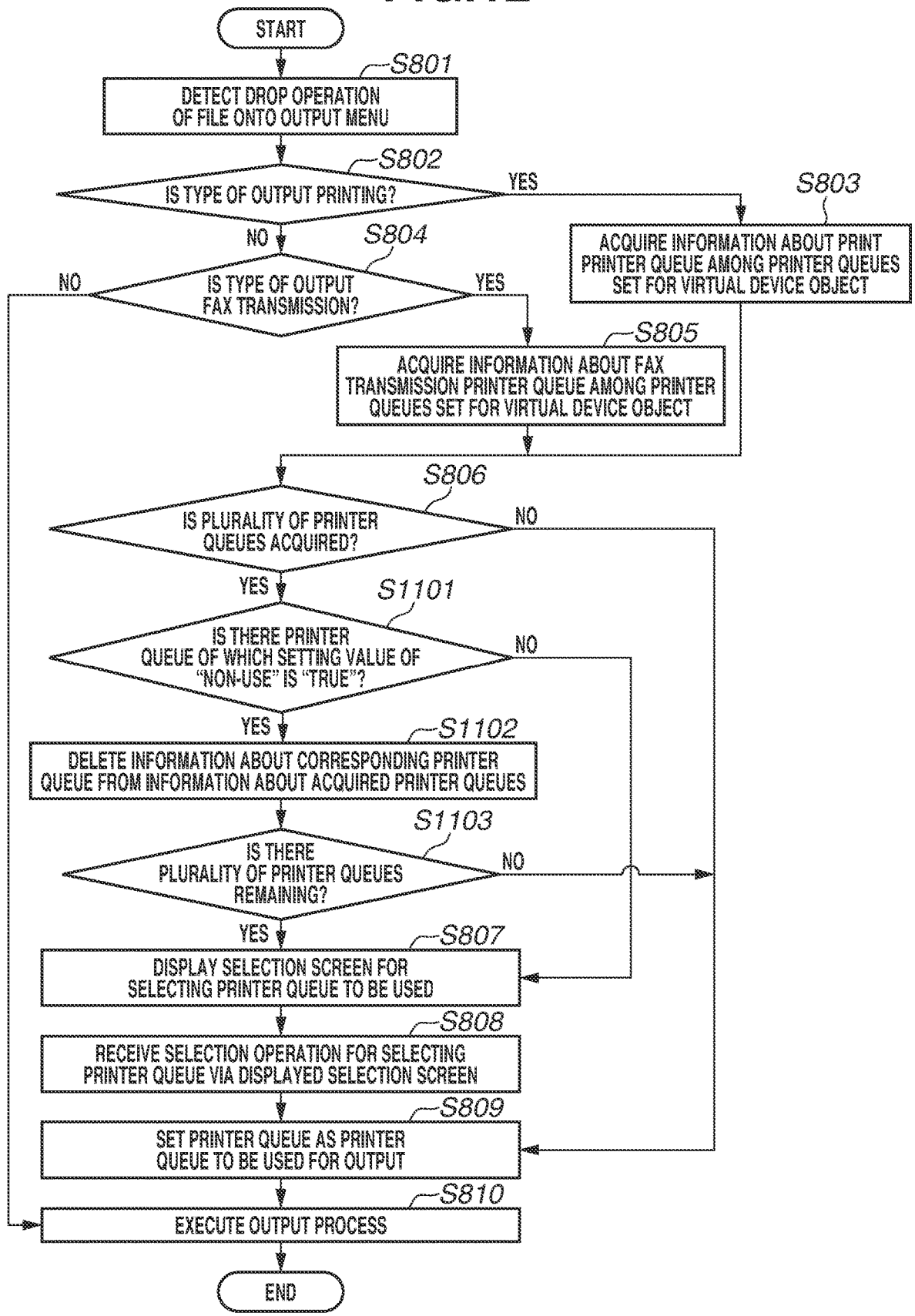
FIG. 12 is a flowchart illustrating a procedure for an output process by the virtual device application.
Figure 15:
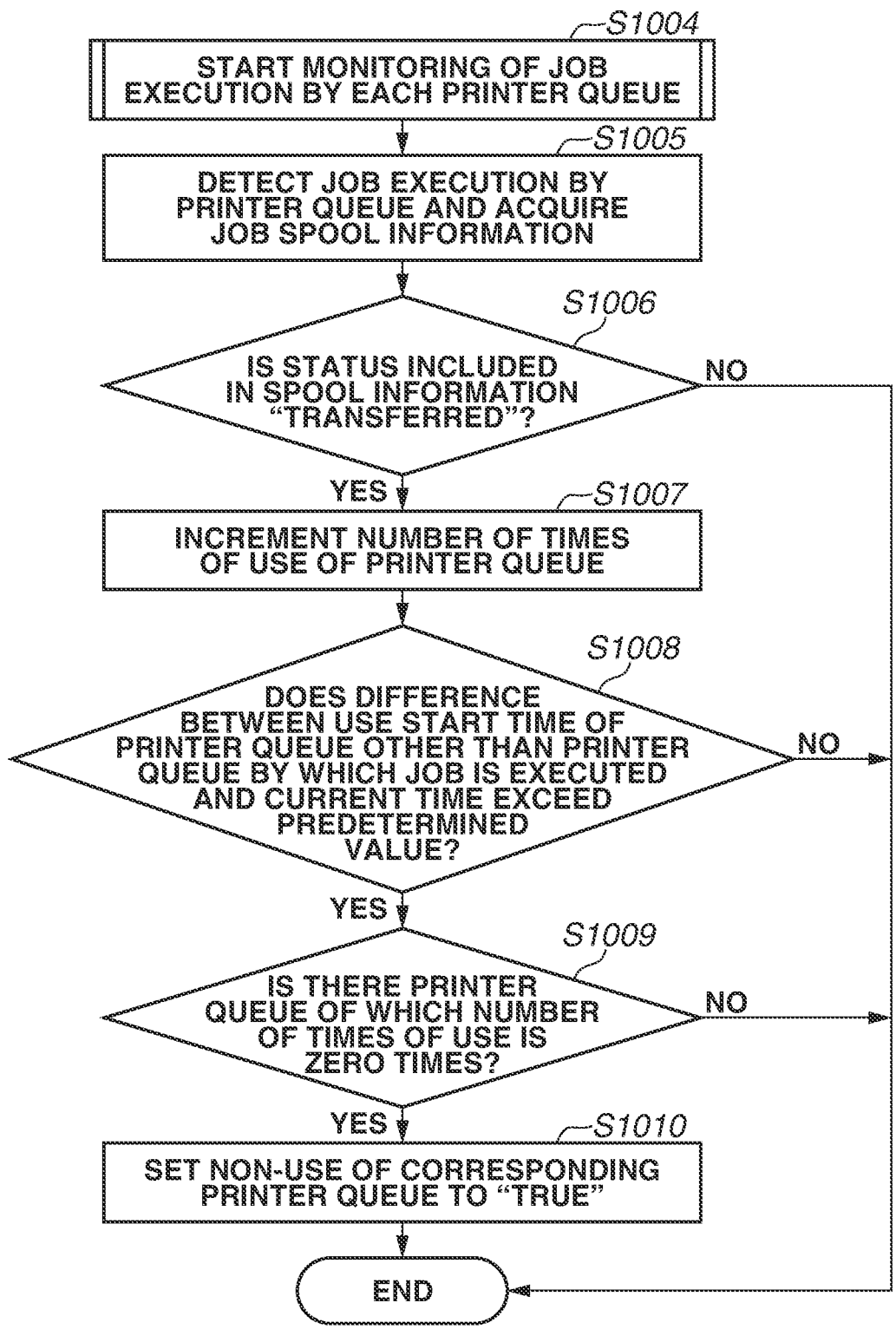
FIG. 15 is a flowchart illustrating details of the monitoring process of a printer queue.

With reference to FIGS. 11, 12, and 15, descriptions are provided of the process of determining whether each of the printer queues is used. FIG. 11 is a flowchart illustrating an example of a process for monitoring the usage state of each of the printer queues set for the virtual device object 501. This processing is started using a start of the virtual device application 410 as a trigger. A spool process processed by the OS is monitored, and if a spool process of a job is detected, the number of times of use 903 (FIG. 10) is incremented by one by counting a job transfer to the image forming apparatus as once.

If the virtual device application 410 starts, then in step S1001, the object management unit 413 references information about the printer queue set for each of the virtual device objects 501, and determines whether there is a plurality of printer queues set for the virtual device object 501. If it is determined, in step S1001, that there is not the plurality of printer queues (NO in step S1001), the processing ends. Even after it is determined that there is not the plurality of printer queues, the monitoring process can be started. However, if there is only one printer queue, the printer queue can be regarded as currently being used without monitoring the usage state of the printer queue, and the processing can end as in the present exemplary embodiment.

If it is determined in step S1001 that there is a plurality of printer queues (YES in step S1001), then in step S1002, the object management unit 413 checks the use start time 904 (FIG. 10) of each of the printer queues and confirms whether the use start time is set. If it is confirmed in step S1002 that the use start time is set (YES in step S1002), the processing proceeds to step S1004. If it is not confirmed in step S1002 that the use start time is set (NO in step S1002), then in step S1003, the object management unit 413 sets the current time (time when presence of a plurality of printer queues is confirmed) as the use start time 904. After the use start time of each of the printer queues is set in step S1003, then in step S1004, the object management unit 413 instructs the output management unit 412 to start monitoring of job execution (spool process) by each of the printer queues. The monitoring process of each of the printer queues will be described in detail with reference to FIG. 15.

With reference to FIG. 15, a description is given of the monitoring process of each of the printer queues. In step S1005, the object management unit 413 detects the job execution using the printer queue, receives a notification of the job execution (spool process) from the output management unit 412, and acquires job spool information. The spool information is information including a status (progress state) of a job, execution time of the job, and an execution user name of the job.

In step S1006, the object management unit 413 references the status of the job included in the spool information and determines whether the status is "TRANSFERRED". The status "TRANSFERRED" indicates that the job is transferred to the image forming apparatus. If the status is other than "TRANSFERRED" (e.g., "WAITING TO BE TRANSFERRED", "CURRENTLY BEING TRANSFERRED", or "CURRENTLY BEING CANCELED") (NO in step S1006), the processing ends.

If it is determined in step S1006 that the status of the job is "TRANSFERRED" (YES in step S1006), then in step S1007, the object management unit 413 increments the number of times of use (number of times of use 903 in FIG. 9) of the printer queue by one.

In step S1008, the object management unit 413 compares the oldest time from among the use start times 904 of the printer queues set for the virtual device object 501 with the current time. As a result of a comparison, if it is determined that a difference between the oldest time and the current time exceeds a predetermined value (e.g., any value such as 10 days) (YES in step S1008), the processing proceeds to step S1009. If it is determined that the difference does not exceed the predetermined value (NO in step S1008), the processing ends. At this time, the printer queue subjected to the comparison process is a printer queue other than the printer queue for which the job execution is detected in step S1005. This is because when a job is executed, a use start time is set for a printer queue of which the use start time is not yet set.

In step S1009, the object management unit 413 references the number of times of use 903 of the printer queue that is determined, in step S1008, to have a difference between the number of times of use 903 and the current time exceeding the predetermined value, and determines whether a printer queue of which the number of times of use is zero times is present. If it is determined that there is no printer queue of which the number of times of use is zero times (NO in step S1009), the processing ends. If it is determined that the printer queue of which the number of times of use is zero times is present (YES in in step S1009), the processing proceeds to step S1010. In step S1010, the object management unit 413 sets the non-use 905 of the printer queue to "TRUE". The order of steps S1008 and S1009 can be reversed. The process of step S1008 is executed to prevent a printer queue that has just been registered and has not been used yet from being excluded from the selection screen 605. The monitoring process of the printer queues has been described above.

In FIG. 15, the process of step S1009 is provided so that a printer queue that has been used at least once remains on the selection screen 605. However, the present disclosure is not limited to this form. Alternatively, a form can be employed in which, if it is determined that a printer queue has not been used for a predetermined period of time or more in step S1008, information about the printer queue is deleted from the selection screen 605. In other words, as long as the non-use 905 of a printer queue that is not being used or a printer queue that has been used but has not been used for the predetermined period of time or more is set to "TRUE", a condition and a processing order for setting the non-use 905 to "TRUE" are not particularly limited.

<Flow of Output Execution Process>

FIG. 12 is a flowchart illustrating processing performed when the output of the virtual device object 501 of the virtual device application 410 is executed. This processing is started by detecting a drop operation of a file onto the output menu 604. Processes similar to those illustrated in FIG. 9 according to the first exemplary embodiment are denoted by the same reference signs and are not described in detail here.

After the screen display management unit 415 detects a drop operation of a file, and the output control unit 411 acquires information about a printer queue set for the virtual device object 501 corresponding to the type of output of the drop operation (steps S801 to S805), and it is determined that the plurality of printer queues is acquired (step S806), then in step S1101, based on the information of each of the set printer queues, the object management unit 413 determines whether there is a printer queue specified as not used. More specifically, the object management unit 413 determines whether the setting value of the non-use 905 set in step S1010 in FIG. 15 is "TRUE" in each of the printer queues.

If it is determined that there is a printer queue of which the setting value of the non-use 905 is "TRUE" (YES in step S1101), then in step S1102, the object management unit 413 deletes the information about the printer queue from the information about the printer queues acquired in step S803 or S805. If it is not determined that there is the printer queue of which the setting value of the non-use 905 is "TRUE" (NO in step S1101), the processing proceeds to step S807.

In step S1103, the object management unit 413 determines whether there is a plurality of printer queues remaining as a result of the process of step S1102. If it is determined that there is the plurality of printer queues remaining (YES in step S1103), the processing proceeds to step S807. In step S807, the screen display management unit 415 displays the selection screen 605. If it is not determined that there is the plurality of printer queues remaining (NO in step S1103), the processing proceeds to step S809. In step S809, the output control unit 411 sets the remaining printer queue as a printer queue to be used for output.

According to the above described exemplary embodiment, in a case where the plurality of printer queues using the same image forming apparatus is set, the printer queue that is not being used by the user is not displayed on a selection screen, thus providing improved use convenience.

In the above descriptions, the printer queue that is not being used is identified using the number of times of use (whether the number of times of use is zero) and the use start time as conditions. However, the condition for identifying the printer queue that is not being used is not limited to this form. For example, a form is also possible in which a particular number of times of use other than zero is used as a threshold or the last use time is managed.

Other Embodiments

In the above exemplary embodiments, as an example of the desktop illustrated in FIGS. 7A, 7B, and 7C, the form has been described in which the virtual device object 600 is associated with the printer queues and with the function executed without transmission to the image forming apparatus, such as a PDF conversion function. However, the present disclosure is not limited to this form. A form can be employed in which the output menu 604 is displayed even before the document 611 is dragged and dropped (FIG. 7A). Alternatively, a form can also be employed in which a function (e.g., PDF conversion) that is not associated with the printer queue is excluded from the output menu 604. A form can also be employed in which display is not performed based on functions of the image forming apparatus as in the output menu 604 and, when a drop operation of the document 611 onto the virtual device object 600 is performed, a selection screen 605 on which printer queues having different functions are mixed together is displayed. More specifically, the display form of the virtual device object associated with the plurality of printer queues is not limited to the form illustrated in FIGS. 7A, 7B, and 7C.

Embodiment(s) of the can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2018-007184, filed Jan. 19, 2018, and No. 2018-157272, filed Aug. 24, 2018, which are hereby incorporated by reference herein in their entirety.

What is claimed is:

1. A client apparatus that transmits a job to an image forming apparatus having a plurality of functions, via a printer queue generated by installing a driver on an operating system (OS) and causes the image forming apparatus to execute an output process of a document, the client apparatus comprising:

at least a processor and at least a memory coupled to the at least the processor and having stored thereon instructions, when executed by the at least the processor, and cooperating to act as:

a display control unit configured to display a virtual device object associated with a plurality of printer queues, at least two or more of the plurality of printer queues being printer queues for executing a job using a first function, wherein the first function is one of the plurality of the functions;

enable the plurality of printer queues associated with the virtual device object to be displayed upon receiving a user operation by the virtual device object; and an execution unit configured to execute image output processing using selected one of the plurality of printer queues displayed by the display control unit, wherein the execution unit executes the image output processing without displaying the plurality of printer queues in a case where a single printer queue is associated with the virtual device object receiving the user operation.

2. The client apparatus according to claim 1,
wherein, in response to receiving a user operation by the virtual device object, the display control unit displays a menu screen for selecting one function from among a plurality of functions of the image forming apparatus associated with the virtual device object, and
upon selection of the one function displayed on the menu screen by the user operation, the display control unit displays the plurality of printer queues associated with the selected one function.

3. The client apparatus according to claim 2, wherein, in a case where there is no printer queue associated with the one function selected on the menu screen, a message that there is no printer queue associated with the one function selected is displayed.

4. The client apparatus according to claim 1, further comprising a determination unit configured to determine whether a virtual device object having the same address information as address information of the image forming apparatus corresponding to the plurality of the printer queues installed on the OS is present on the desktop,
wherein in a case where the determination unit determines that a virtual device object having the address information is not present, the virtual device object having the address information is created.

5. The client apparatus according to claim 1, further comprising a management unit configured to manage a number of times of use of the printer queue and a use start time of the printer queue,
wherein based on the number of times of use and the use start time managed by the management unit, a printer queue to be displayed on the first screen is set.

6. The client apparatus according to claim 1, wherein the virtual device object receives, on a single screen, an instruction to a plurality of printer queues or a function including a document conversion process.

7. The client apparatus according to claim 1, wherein the user operation is a drag-and-drop operation in which the document is dragged and dropped onto the virtual device object or the first screen.

8. The client apparatus according to claim 1, wherein the printer queue is a print printer queue or a fax transmission printer queue.

9. A control method for controlling a client apparatus that transmits a job to an image forming apparatus having a plurality of functions, via a printer queue generated by installing a driver on an operating system (OS) and causes the image forming apparatus to execute an output process of a document, the control method comprising:
displaying a virtual device object associated with a plurality of printer queues, at least two or more of the plurality of printer queues being printer queues for executing a job using a first functoin, wherein the first function is one of the plurality of the functions;
enabling the plurality of printer queues associated with the virtual device object to be displayed upon receiving a user operation by the virtual device object displayed by the displaying; and
executing image output processing using selected one of the plurality of printer queues,
wherein the executing executes the image output processing without displaying the plurality of printer queues in a case where a single printer queue is associated with the virtual device object receiving the user operation.

10. The control method according to claim 9,
wherein, in response to receiving a user operation by the virtual device object, the enabling displays a menu screen for selecting one function from among a plurality of functions of the image forming apparatus associated with the virtual device object, and
upon selection of the one function displayed on the menu screen by the user operation, the enabling further displays the plurality of printer queues associated with the selected one function.

11. The control method according to claim 9, further comprising determining whether a virtual device object having the same address information as address information of the image forming apparatus corresponding to the plurality of the printer queues installed on the OS is present on the desktop,
wherein in a case where the determining determines that a virtual device object having the address information is not present, the virtual device object having the address information is created.

12. The control method according to claim 9, further comprising managing a number of times of use of the printer queue and a use start time of the printer queue,
wherein based on the number of times of use and the use start time managed by the managing, a printer queue to be displayed on the first screen is set.

13. The control method according to claim 9, wherein the virtual device object receives, on a single screen, an instruction to a plurality of printer queues or a function including a document conversion process.

14. The control method according to claim 9, wherein the user operation is a drag-and-drop operation in which the document is dragged and dropped onto the virtual device object or the first screen.

15. The control method according to claim 9, wherein the printer queue is a print printer queue or a fax transmission printer queue.

16. A non-transitory computer-readable storage medium storing instructions that, when executed by one or more processors, cause the one or more processors to execute a method for controlling a client apparatus that transmits a job to an image forming apparatus having a plurality of functions, via a printer queue generated by installing a driver on an operating system (OS) and causes the image forming apparatus to execute an output process of a document, the method comprising:
displaying a virtual device object associated with a plurality of printer queues, at least two or more of the plurality of printer queues being printer queues for executing a job using a first function, wherein the first function is one of the plurality of the functions;
enabling the plurality of printer queues associated with the virtual device object to be displayed upon receiving a user operation by the virtual device object displayed by the displaying; and
executing image output processing using selected one of the plurality of printer queues,
wherein the executing executes the image output processing without displaying the plurality of printer queues in a case where a single printer queue is associated with the virtual device object receiving the user operation.

17. The non-transitory computer-readable storage medium according to claim 16,
wherein, in response to receiving a user operation by the virtual device object, the enabling displays a menu screen for selecting one function from among a plurality of functions of the image forming apparatus associated with the virtual device object, and upon selection of the one function displayed on the menu screen by the user operation, the enabling further displays the plurality of printer queues associated with the selected one function.

18. The non-transitory computer-readable storage medium according to claim 16, further comprising determining whether a virtual device object having the same address information as address information of the image forming apparatus corresponding to the plurality of the printer queues installed on the OS is present on the desktop, wherein in a case where the determining determines that a virtual device object having the address information is not present, the virtual device object having the address information is created.

19. The non-transitory computer-readable storage medium according to claim 16, further comprising managing a number of times of use of the printer queue and a use start time of the printer queue, wherein based on the number of times of use and the use start time managed by the managing, a printer queue to be displayed on the first screen is set.

20. The non-transitory computer-readable storage medium according to claim 16, wherein the virtual device object receives, on a single screen, an instruction to a plurality of printer queues or a function including a document conversion process.

21. The non-transitory computer-readable storage medium according to claim 16, wherein the user operation is a drag-and-drop operation in which the document is dragged and dropped onto the virtual device object or the first screen.

22. The non-transitory computer-readable storage medium according to claim 16, wherein the printer queue is a print printer queue or a fax transmission printer queue.

\* \* \* \* \*